(12) United States Patent
Tucker

(10) Patent No.: US 7,878,334 B2
(45) Date of Patent: Feb. 1, 2011

(54) SIFTER SHOVEL

(75) Inventor: James Tucker, Hartford City, IN (US)

(73) Assignee: W.F. Valentine & Co., Reading, MI (US)

( * ) Notice: Subject to any disclaimer, the term of this patent is extended or adjusted under 35 U.S.C. 154(b) by 0 days.

(21) Appl. No.: 11/853,037

(22) Filed: Sep. 11, 2007

(65) Prior Publication Data

US 2009/0065405 A1 Mar. 12, 2009

(51) Int. Cl.
*B07B 1/49* (2006.01)

(52) U.S. Cl. .................. 209/418; 209/417; 209/419; 209/420

(58) Field of Classification Search .......... 209/417, 209/418, 419; 294/55; 37/264, 379, 903; 7/116

See application file for complete search history.

(56) References Cited

U.S. PATENT DOCUMENTS

| 93,336 | A | * | 8/1869 | Palmer | 209/419 |
|---|---|---|---|---|---|
| 127,405 | A | * | 6/1872 | Butler | 209/419 |
| 1,146,609 | A | * | 7/1915 | Anderson | 294/49 |
| 4,247,141 | A | * | 1/1981 | Grint | 294/49 |
| 4,305,376 | A | * | 12/1981 | Neugent | 126/242 |
| 5,383,696 | A | * | 1/1995 | Speier | 294/49 |
| 5,601,325 | A | * | 2/1997 | Sokaski | 294/49 |
| 5,848,697 | A | * | 12/1998 | Eash | 209/419 |
| 6,598,334 | B1 | * | 7/2003 | Edevold | 43/4 |
| 7,523,973 | B2 | * | 4/2009 | Lin et al. | 294/1.3 |
| 2006/0180512 | A1 | * | 8/2006 | Allen | 209/418 |
| 2009/0038553 | A1 | * | 2/2009 | Lin et al. | 119/166 |

\* cited by examiner

*Primary Examiner*—Terrell H Matthews
(74) *Attorney, Agent, or Firm*—Carlson, Gaskey & Olds, PC

(57) ABSTRACT

An example sifter shovel assembly includes a handle and a scoop secured to the handle. The scoop includes an outer edge portion. An apertured area of the scoop has a plurality of apertures extending through the scoop and an unapertured area of the scoop extends from the outer edge to the apertured area. An example method of assembling a sifter shovel includes creating a plurality of apertures in a sheet of material and forming the sheet of material into a general scoop shape. The example method then secures a handle to an unapertured area of the sheet of material.

1 Claim, 2 Drawing Sheets

SIFTER SHOVEL

BACKGROUND OF THE INVENTION

This invention relates to a shovel for moving and separating material.

Shovels are well known and frequently used for moving loose material such as sand, soil, mulch, and sawdust. Typical shovels include an elongated handle attached at one end to a scoop or blade. A user forces the scoop into the material using the handle, and then transports the material to another location.

Different sizes and types of materials are often mixed. Separating the materials can be time consuming and difficult if the user desires to move only one of the mixed materials. As an example, removing animal waste from an animal bedding material like sawdust often undesirably results in removing a substantial amount of sawdust with the animal waste. Replacing the removed sawdust is costly.

Previous attempts to separate mixed materials have included using shovels fitted with a mesh-type scoop. Spaces between the mesh allow a smaller material to fall through the scoop while the mesh prevents the larger material from falling through. These previous designs have proven costly and complex to manufacture. Further, replacing a traditional scoop with mesh type material weakens the shovel, and at least some previous designs include sharp or jagged edges around the perimeter of the shovel, which may injure or otherwise harm the user.

It would be desirable to provide a simplified and strengthened sifter shovel.

SUMMARY OF THE INVENTION

An example sifter shovel assembly includes a handle and a sheet of material forming a scoop, the scoop secures adjacent a first end of the handle. An apertured area of the scoop having a plurality of apertures extending thru the sheet of material. The apertures have a general diamond shape and are formed using at least one of a plasma cutter, a laser cutter, a material punch, and a water jet cutter. An unapertured area near an outer edge of the sheet of material extends to a central portion of the sheet of material. A plurality of mechanical fasteners securing the handle to the central portion.

An example method of assembling a sifter shovel includes creating a plurality of apertures in a sheet of material and forming the sheet of material into a general scoop shape. The example method then secures a handle to an unapertured area of the sheet of material.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1:
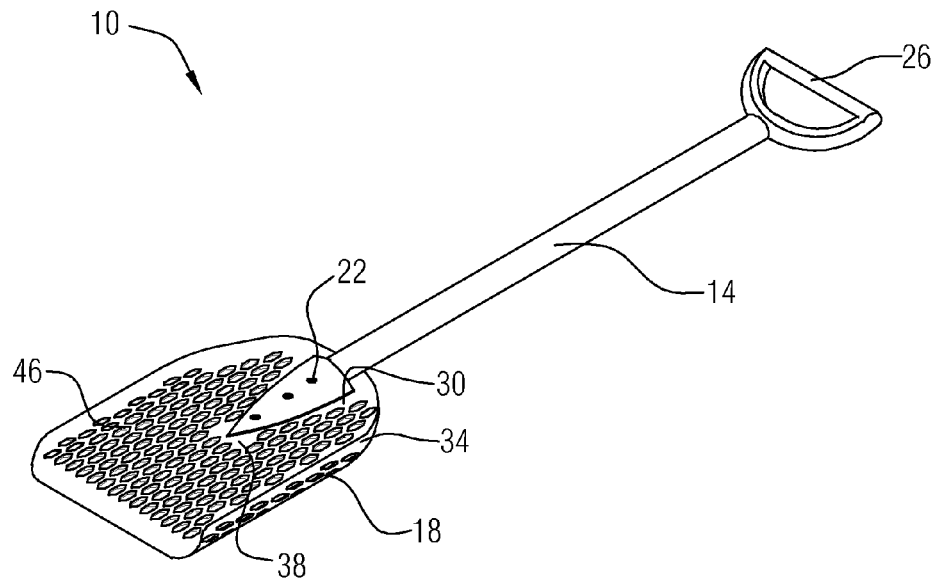
FIG. 1 illustrates a perspective view of an example sifter shovel assembly.

An example sifter shovel assembly 10 includes a handle 14 and a scoop 18, as shown in FIG. 1. A plurality of mechanical fasteners 22, such as sheet metal screws, secure a first end of the handle 14 to the scoop 18. A second end of the handle 14 includes a hand grip 26.

In this example, the handle 14 attaches to the scoop 18 adjacent an unapertured area 30 that extends from an outer edge portion 34 of the scoop 18 to a central portion 38 of the scoop 18. The unapertured area 30 also extends around the outer edge portion 34 of the scoop 18. The remaining portions of the scoop 18 include a plurality of apertures 46. The apertures 46 in this example do not extend to the outer edge portion 34 of the scoop 18.

Figure 2:
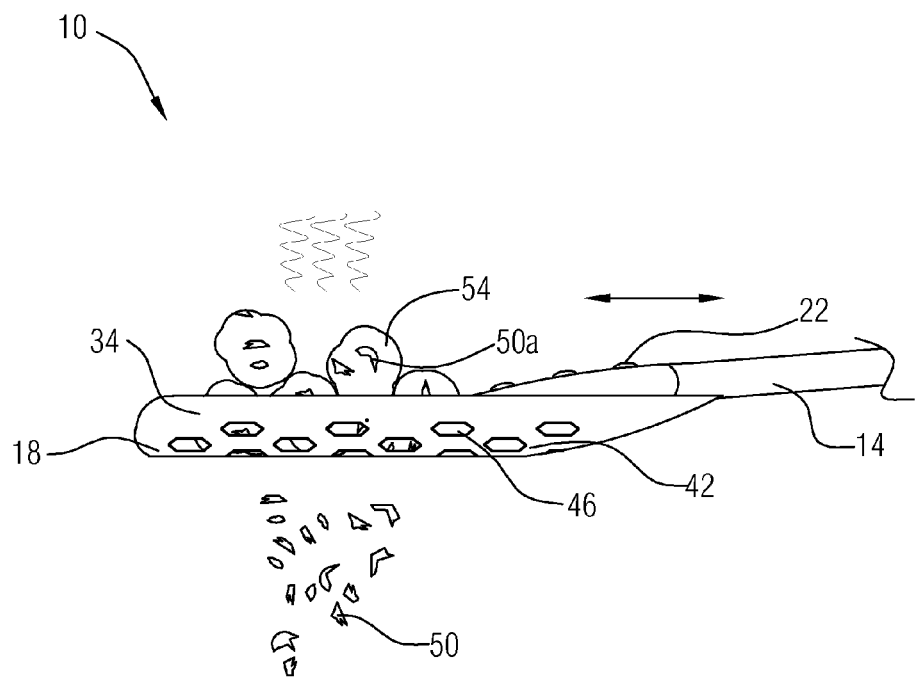
FIG. 2 illustrates a portion of the sifter shovel of FIG. 1.

Referring now to FIG. 2 with continuing reference to FIG. 1, the apertures 46 facilitate separating a smaller material 50 from a larger material 54. In this example, the smaller material 50 comprises an animal bedding material such as sawdust. The larger material 54 is animal waste, which is typically larger than the sawdust used for bedding the animal.

To remove the larger material 54 from the smaller material 50, a user first lifts both materials 50, 54 in the scoop 18 from a floor in an animal stall for example. As the user lifts the scoop 18, some of the smaller material 50 moves through the apertures 46 and falls back to the stall floor. The apertures 46 are sized for permitting the smaller material 50 to move through the apertures 46 while maintaining the larger material 54 within the scoop 18. Moving the sifter shovel assembly 10 back and forth may loosen additional smaller material 50 for moving through the apertures 46 to the stall floor. The larger material 54 may then be moved to a new location. Residual smaller material 50a may remain in the scoop 18, however, this residual smaller material 50a is oftentimes stained and undesirable for bedding an animal.

Solid animal waste is one example of the larger material 54. Other examples may include clumps of the smaller material 50, which may result from liquid animal waste for example. The example shovel assembly 10 facilitates separating the clumps of smaller material 50 from remaining portions of the smaller material 50 similarly to the solid animal waste.

Figure 3:
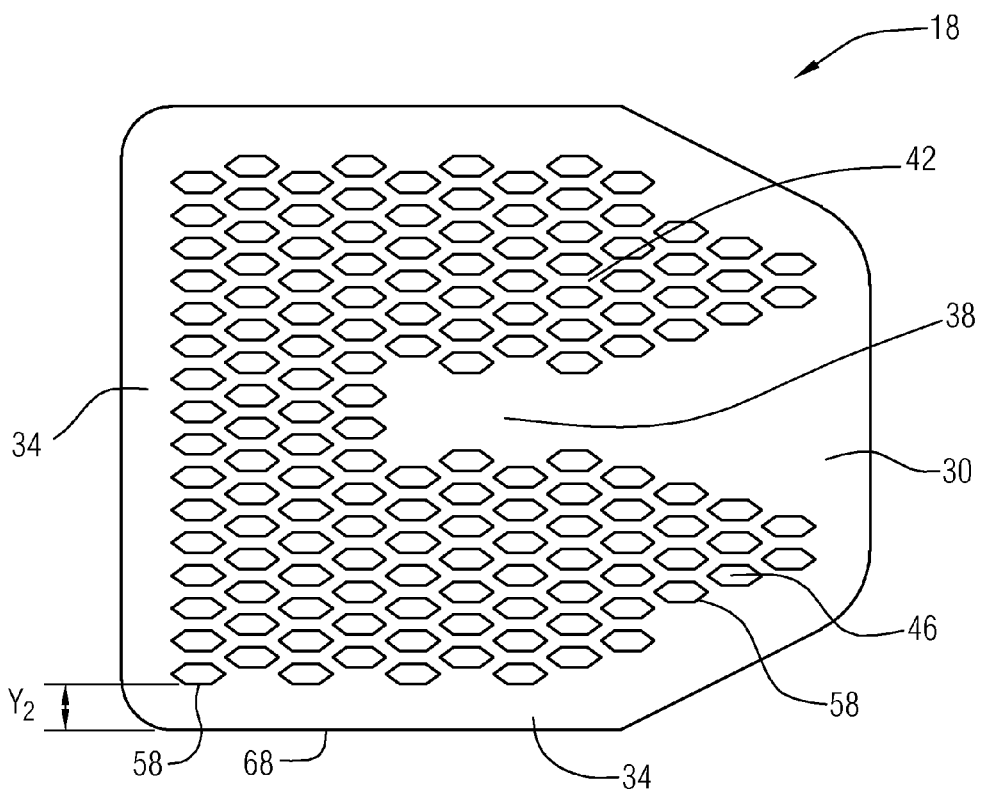
FIG. 3 illustrates the scoop of the sifter shovel of FIG. 1 prior to forming.

The scoop 18 in this example is formed from a single sheet of material as shown in FIG. 3. In this example, the scoop 18 is shown in an unassembled state and prior to bending and forming operations. Known manufacturing processes exist for bending and forming a generally flat sheet of material into a scoop profile. The scoop 18 includes the apertured area 42 across a large portion of the scoop 18 face. The unapertured area 30 is located near the outer edge portion 34 of the scoop 18 and extends near the central portion 38 of the scoop 18. The unapertured area 30 strengthens the scoop 18 where the handle (FIG. 1) secures to the scoop 18. Further, the unapertured area 30 near the outer edge portion 34 provide a relatively smooth outer scoop edge 68, which may lessen the chance of user injury and liability and also adds additional strengthening structure the scoop 18.

Figure 4:
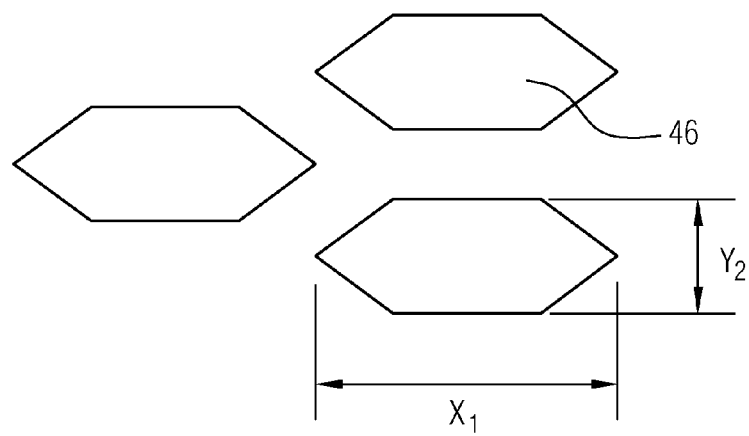
FIG. 4 illustrates a close-up view of a few of the apertures defined by the sifter shovel of FIG. 1.

Referring now to FIG. 4, the apertures 46 have a general diamond shape. Although shown in FIG. 3 as consistently shaped across the face of the scoop 18, those skilled in the art and having the benefit of this disclosure would understand that the individual dimensions of the apertures 46 may stretch and change as the scoop 18 moves from the generally flat sheet of material shown in FIG. 3 to a scoop type profile. Various manufacturing operations may be used to create the apertures in the scoop 18, including plasma cutting, laser cutting, water jet cutter, and material punches.

The example apertures 46 have a dimension X and a dimension $Y_1$ smaller than dimension X. The longer dimension X generally aligns with the direction the handle 14 extends from the scoop 18 (FIG. 1). Further, the distance $Y_2$ between an aperture edge 58 located adjacent the outer edge portion 34 of the scoop 18 and the outer scoop edge 68 is typically greater than the dimension $Y_1$ across one of the apertures 46.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of assembling a sifter shovel, comprising:
 a.) cutting a plurality of elongated apertures into a sheet of material:
 b.) forming the sheet of material into a general scoop shape, the sheet of material having a continuous and flat leading edge extending between opposing sides of the sheet of material; and
 c.) securing a handle to an unapertured area of said sheet material and the unapertured area extending to a central portion of said sheet of material.

* * * * *